March 22, 1966     G. R. LUCAS     3,242,001
STEEL STRAPPING COATED WITH THIN FILM CONTAINING A LARGE
PROPORTION OF FINELY DIVIDED ZINC
Filed June 11, 1962
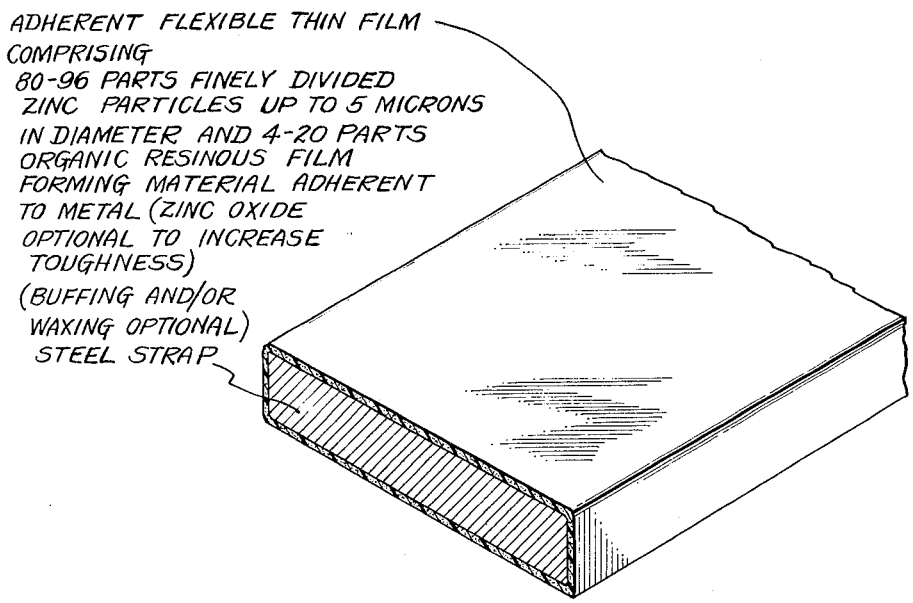
INVENTOR
*Glennard R. Lucas*
BY
*Schneider, Dressler, Goldsmith & Clement* ATTORNEYS 3,242,001
STEEL STRAPPING COATED WITH THIN FILM CONTAINING A LARGE PROPORTION OF FINELY DIVIDED ZINC
Glennard R. Lucas, Glenview, Ill., assignor to Signode Corporation, a corporation of Delaware
Filed June 11, 1962, Ser. No. 201,340
8 Claims. (Cl. 117—71)

The present invention relates to ligatures which are adherently coated with a thin film comprising a minor proportion of organic resinous film forming material and a large proportion of finely divided zinc to provide a durable and flexible product resistant to cracking and failing and characterized by unusually superior weather resistance. More particularly, the invention relates to strap and especially steel strap having a continuous and uniform coating, as indicated above, in which the coating has a thickness of from 0.1–1.0 mil, preferably from 0.2–0.5 mil. The invention includes modification of the coating to provide an exceptionally high capacity for frictional engagement.

The invention is especially directed to the production of thin flexible and weather resistant coatings utilizing butadiene polymers and copolymers, especially partially oxidized copolymers of butadiene and styrene of relatively low molecular weight. These butadiene polymers are preferably cured by exposure to elevated curing temperatures above 600° F., preferably above 650° F.

While butadiene polymers are preferred, other organic resinous film-forming materials may be used as indicated hereinafter.

It is well known to coat steel and other metals with organic resinous materials to provide some degree of protection from the elements to better fit the product for outdoor exposure. However, and especially when the organic resinous film is thin, weather resistance is not satisfactory. Pigmentation of the organic resinous film is somewhat beneficial, but weather resistance is still inadequate.

It is also known that steel can be protected by providing it with a coating of zinc metal, as by galvanizing the steel, but such protection is too costly to be relied upon in many instances.

Moreover, the incorporation of zinc dust in coatings, both organic and inorganic, is known, but these coatings are lacking in flexibility and one would not expect to find that organic resinous coatings which are heavily loaded with zinc to possess the flexibility essential to ligature use.

In accordance with the invention, it has been found that when organic resinous film-forming material is heavily loaded with zinc dust in an extremely finely divided condition to contain from 80–96% by weight of zinc particles and preferably from 83–95% by weight of zinc particles, that thin coatings thereof upon ligatures, and especially upon steel strap, are durable and flexible, resist cracking and failing, and are characterized by unusually superior weather resistance. Indeed, and especially when the organic resinous film-forming material is a butadiene polymer or copolymer cured by exposure to elevated curing temperatures above 600° F., the coated strap of the invention is equivalent or superior in every way to commercial electrogalvanized strap, and considerably more economical to produce.

The coated strap as directly produced has a frosted surface appearance which can be buffed, especially by buffing with free zinc dust, to provide a bright and shiny surface and this is one feature of the invention. This buffing is preferably achieved using free zinc dust to provide a bright reflective surface with no tendency to damage or dislodge the zinc-rich resinous coating.

In many instances, it is desirable to provide strapping having a low friction surface which is easier to handle and this is provided in the invention by waxing the coated surface.

In other instances, and especially in heavy duty applications, it is desirable to provide a high friction surface and, hence, great holding power. Such high friction surfaces are hard to provide with coated strap. In the invention, it has surprisingly been found that the zinc-rich coatings which are used provide a high friction surface, and, moreover, the toughness and high friction quality is still further enhanced by the inclusion in the coating of a proportion of zinc oxide.

Another feature of the invention is the maintenance of weather resistance despite abrasion of the coating by handling equipment and this is achieved to an unusual extent by the invention.

Referring more particularly to the zinc dust which is employed, zinc dust of conventional particle size is not satisfactory. The unusual flexible and adherent coatings of the invention require a zinc dust having an average particle size of up to about 10 microns and preferably smaller, e.g., less than about 5 microns. A zinc dust having an average particle size of 3 microns is illustrative of preferred practice and will be used to exemplify the invention.

Broadly, any organic resinous film-forming material which forms a film adherent to metal may be used. Nevertheless, in the preferred aspects of the invention very high performance requirements are imposed and these are preferably met by the selection of butadiene polymers and copolymers cured by exposure to curing temperatures above 600° F.

Referring more particularly to the butadiene polymers and copolymers which are preferably employed in accordance with the invention, these are oily butadiene polymers characterized by an average molecular weight of from 1,000 to about 30,000 and which contain at least 75% by weight of copolymerized butadiene-1,3, any balance of the copolymer being constituted by copolymerizable monoethylenically unsaturated monomer. Notably, in addition to butadiene, about 10% by weight of the copolymer is desirably constituted by styrene, although other olefins copolymerizable with butadiene such as vinyl toluene, etc., may be employed. If desired, small proportions ranging up to about 2% of ethylenic monomers including the carboxyl group and especially dicarboxylic acid anhydrides, such as maleic anhydride or citraconic anhydride may be employed.

The preferred polymers are oily liquid polymers having an average molecular weight ranging from about 5,000 to about 15,000 and containing butadiene and styrene in a weight ratio of about 90/10.

The resins may be used either in the non-oxidized state so that the acid number is 0 or in the partially oxidized state produced by bubbling air or other oxygen-containing gas through a heated mass of the copolymer until the oxygen content of the polymer or copolymer is up to about 10% by weight, but usually up to about 2–3% by weight. Conveniently, oxygenation is continued until the product has an acid number in the range of from 5–25, preferably in the range of from 8–20.

By average molecular weight, it is intended to refer to the molecular weight determined by boiling point elevation in ethylene dichloride.

The butadiene copolymer may be employed alone or in combination with other synthetic resins, especially solvent-soluble, heat-hardenable urea-formaldehyde resins which, as is well known, are provided by condensing urea with an excess of formaldehyde and then etherifying the product with $C_3$–$C_8$ alcohol to provide solvent solubility to permit the urea-formaldehyde resin to be placed in compatible organic solvent solution with the butadiene polymer or copolymer.

The invention in some of its preferred aspects will be illustrated in the following examples:

EXAMPLE 1

Zinc-rich coating solutions are prepared by stirring appropriate proportions of zinc dust having an average particle size of 3 microns into a 50% solvent solution containing a partially oxidized copolymer of butadiene and styrene in a solvent mixture containing Solvesso 100 and isopropanol in a weight ratio of 3/1. The copolymer used has an average molecular weight of approximately 9,000, contains butadiene and styrene in weight proportions of 90/10, and is oxidized to an acid number of 10.

After mixing, additional Solvesso 100 or xylene is added to thin the mixture to the viscosity desired for coating application.

In this way, numerous zinc-rich paints were made as indicated in tabular form below.

| Sample No. | Composition of Sample | Percent Zinc in Film |
|---|---|---|
| 1 | 5 pounds of zinc dust per gallon of 50% resin solution. | |
| 2 | 20 pounds of zinc dust per gallon of 50% resin solution. | 83.8 |
| 3 | 25 pounds of zinc dust per gallon of 50% resin solution. | 86.7 |
| 4 | 30 pounds of zinc dust per gallon of 50% resin solution. | 88.7 |
| 5 | 36 pounds of zinc dust per gallon of 50% resin solution. | 90.4 |
| 6 | 50 pounds of zinc dust per gallon of 50% resin solution. | 92.8 |
| 7 | 73 pounds of zinc dust per gallon of 50% resin solution. | 95.1 |

In each instance, the product is a smooth creamy mixture having no unreasonable tendency to settle and is useful for applying smooth, flexible and adherent films to steel strap. The capacity of these films of high zinc content to resist corrosion is illustrated in Table I.

*Table I*

| | Effect of Salt Fog For— | | | |
|---|---|---|---|---|
| | 6 Hours | 20 Hours | 48 Hours | 72 Hours |
| Sample No.: | | | | |
| 1 | Rust | Rust | Rust | Rust. |
| 2 | 0 | 0 | 0 | Trace. |
| 3 | 0 | 0 | 0 | Trace. |
| 4 | 0 | 0 | 0 | Trace. |
| 5 | 0 | 0 | 0 | Trace. |
| 6 | 0 | 0 | 0 | 0. |
| 7 | 0 | 0 | 0 | 0. |
| Commercial Electrogalvanized Product A. | 0 | Trace | Moderate | Severe. |
| Commercial Electrogalvanized Product B. | 0 | Severe | Severe | Severe. |

The samples containing 90% or more of zinc (Samples 5, 6 and 7) could be buffed to provide a bright and shiny surface, and this is best done by directing zinc dust at high velocity onto the coated surface.

As previously indicated, high friction or holding power is a very desirable quality for friction seals in heavy duty application.

To evaluate the capacity of the coated strap, steel strap 1.251″ x 0.032″ was sealed with heavy duty seals using two crimps applied by an air sealer operated at 100 p.s.i. air pressure and the completed seal was tested to determine the pulling force necessary to cause the straps to separate. The steel strap employed possessed an ultimate tensile strength of 5890 pounds.

The above tests as applied to the test strap coated with black paint conventionally used in coating strap produced strap separation strengths of from 42–50% of the ultimate strength, for an average of 46% corresponding with strap separation at 2720 pounds. In contrast, Samples 2–7 separated at loadings of from 3720–3980 pounds (63–67% of ultimate strength). Buffing with #22 zinc dust or #122 zinc dust had no effect in changing the frictional holding power of the coating, despite the lustre and shine provided thereby. In further contrast, and where low friction is desired to facilitate handling, overcoating with an aqueous wax emulsion lowered the frictional holding power in the same test to 1460–1560 pounds (25–26% of ultimate strength).

Stated differently, when one desires weather resistant resin-coated strap of high frictional holding power, the invention uniquely provides this result.

EXAMPLE 2

A further feature of the invention is the finding that the incorporation of a minor proportion of zinc oxide, e.g., from 5–75% by weight, based on the weight of the zinc, preferably from 10–50% by weight, based on the weight of the zinc, provides improved filming and produces a tougher film as is illustrated by the incorporation of 10.6 pounds per gallon of zinc oxide in Sample 6 of Example 1. When the zinc oxide-containing coated strap of the present example is tested in a heavy duty seal as described in Example 1, failure occurred at an ultimate strength in the range of from 66–73%, for an average failure at 70%, corresponding with the force of 4100 pounds for separation of the straps. In the absence of zinc oxide, Samples 6 and 7 of Example 1 fail at an average loading of 65% of the ultimate strength, thus establishing the significant improvement in toughness achieved with a minor proportion of zinc oxide.

The zinc oxide-containing coating responds well to buffing and there is little tendency of paint removal during the buffing treatment. Moreover, when specimens of the zinc oxide-containing coated strap having feed wheel marks thereupon are subjected to salt fog for 72 hours, the specimens show no rust despite the feed wheel marks thereupon.

EXAMPLE 3

Example 1 is repeated employing, as the organic resinous film-forming material adherent to metal, a copolymer of butadiene and styrene in weight proportions of 90/10 and having an average molecular weight of approximately 9,000. In contrast with Example 1, the copolymer is not oxidized so that the acid number is 0, and the copolymer possesses greater unsaturation evidenced by an iodine number of approximately 300. The copolymer is used as a 50% solvent solution in Varsol. The extremely finely divided zinc dust is incorporated in the coating solution as reported in Example 1 and Varsol is used to dilute the mixture to application viscosity, e.g., for application by dipping.

The results achieved in the present example are essentially the same as those reported in Example 1, the applicability of the non-oxidized copolymer representing an economy both in resin cost and in the cost of solvents required for application.

EXAMPLE 4

Example 1 is repeated again employing as the organic resinous film-forming material adherent to metal, a high molecular weight linear condensation product of epichlorohydrin and bisphenol A, the product being a high molecular weight polyether having an average molecular weight of approximately 100,000. The resin is employed as a 40% solution in methyl ethyl ketone solvent. The zinc dust is incorporated as in Example 1 and the ethyl ether of ethylene glycol is employed as diluent to adjust viscosity. The coated straps produced using these materials, though easier to scratch and less stable toward buffing, are quite strong, possessing reasonable solvent resistance and excellent salt spray resistance.

All of the steel strapping coated in accordance with the invention is coated with a film having a thickness of 0.4 mil and cured in a hot air furnace for 1 minute at 700° F. On the other hand, curing temperatures are not critical since lower temperatures such as 400° F. for 10 minutes provides an adequate cure and more vigorous cures such as may be obtained by an exposure at 700° F. for 2 minutes or at 800° F. for 1 minute, produces a somewhat more discolored product, but the important film properties remain excellent. As previously indicated, the more elevated curing temperatures above 600° F. appear to provide a somewhat tougher and more adherent film, especially when the butadiene polymers are employed.

In the foregoing examples, "Solvesso 100" is a commercial mixed aromatic hydrocarbon solvent, including a minor amount of aliphatic solvent. Typical physical data for Solvesso 100 is shown in the listing which follows:

| | |
|---|---|
| Specific gravity at 60/60° F. | 0.8749 |
| Flash, ° F. (tag closed cup) min. | 100 |
| Distillation ASTM (D268): | |
| Initial boiling point, ° F. | 306 |
| 10% | 311 |
| 50% | 317 |
| 90% | 327 |
| Dry point, ° F. | 343 |
| Viscosity, cp., at 25° C. | 0.797 |
| K-B value (toluol=100) | 90 |
| K-B value (after 75% is evaporated) | 98 |
| Mixed aniline point, ° C. | 12.0 |
| Percent aromatics | 99.5 |

It is desired to point out that the present invention permits further pigmentation of the coating solutions which are used to include pigments and/or dyes other than the extremely finely divided zinc dust which is essential to the invention and the zinc oxide which constitutes a preferred aspect of the invention. Thus, titanium dioxide, carbon black and other pigments may be employed to obtain a desired color or to achieve some specific ornamental effect. However, it should also be noted that the uniquely superior weather resistance provided by the invention is so unusual that it is deleteriously affected by the inclusion of other active metal particles as is illustrated by Table II.

Table II

| Sample No. (From Example I) | Effect of Salt Fog For— | | | |
|---|---|---|---|---|
| | 6 Hours | 20 Hours | 48 Hours | 72 Hours |
| 2 | 0 | 0 | 0 | Trace |
| 2+1 pound per gallon of aluminum paste. | 0 | Trace | Moderate | Moderate |
| 5 | 0 | 0 | 0 | Trace. |
| 5+1 pound per gallon of aluminum paste. | 0 | Trace | Trace | Rust at scratches and edges. |

Ligature coated in accordance with the invention from the standpoint of coated steel strap is illustrated in the accompanying drawing.

The invention is defined in the claims which follow.

I claim:
1. Steel strapping adherently coated with a thin and flexible film having a thickness of from 0.1–1.0 mil and consisting essentially of from 80–96 parts by weight of finely divided zinc particles having an average particle size less than about 5 microns in diameter, said zinc particles being bonded to one another and to the steel surface of said strapping to form said adherent and flexible film by from 4–20 parts by weight of organic resinous film-forming material selected from the group consisting of a heat-cured oily butadiene polymer containing at least 75% by weight of polymerized butadiene-1,3 with the balance of said polymer being polymerized monoethylenically unsaturated monomer, said polymer having an average molecular weight of from about 1,000 to about 30,000 and high molecular weight linear condensation products of epichlorohydrin and bisphenol A having an average molecular weight of approximately 100,000.

2. Steel strapping as recited in claim 1 in which said film has a thickness of from 0.2–0.5 mil.

3. Steel strapping as recited in claim 2 in which said zinc particles are present in an amount of from 83–95 parts by weight and said film-forming material is present in an amount of from 5–17 parts by weight.

4. Steel strapping as recited in claim 1 in which said film is overcoated with wax to provide a low friction surface.

5. Steel strapping as recited in claim 1 in which said butadiene polymer is a copolymer of butadiene and styrene containing about 10% by weight of copolymerized styrene.

6. Steel strapping as recited in claim 1 in which said film-forming resin is high molecular weight linear condensation products of epichlorohydrin and bisphenol A having an average molecular weight of approximately 100,000.

7. Steel strapping adherently coated with a thin and flexible film having a thickness of from 0.1–1.0 mil and consisting essentially of from 80–96 parts by weight of finely divided zinc particles having an average particle size less than about 5 microns in diameter, said zinc particles being bonded to one another and to the steel surface of said strapping to form said adherent and flexible film by from 4–20 parts by weight of organic resinous film-forming material selected from the group consisting of a heat-cured oily butadiene polymer containing at least 75% by weight of polymerized butadiene-1,3 with the balance of said polymer being polymerized monoethylenically unsaturated monomer, said polymer having an average molecular weight of from about 1,000 to about 30,000 and high molecular weight linear condensation products of epichlorohydrin and bisphenol A having an average molecular weight of approximately 100,000, said film further including from 5–75%, based on the weight of said zinc, of zinc oxide.

8. Steel strapping as recited in claim 7 in which said film includes from 10 to 50%, based on the weight of said zinc, of zinc oxide.

References Cited by the Examiner

UNITED STATES PATENTS

| | | | |
|---|---|---|---|
| 510 | 12/1837 | Sorel | 117—71 |
| 304,069 | 8/1884 | Brown | 117—71 |
| 1,154,651 | 9/1915 | Morf | 117—71 |
| 2,625,523 | 1/1953 | Garber et al. | 117—132 |
| 2,878,141 | 3/1959 | Canniff | 117—132 X |
| 2,952,561 | 9/1960 | Young et al. | 117—128.4 X |
| 2,968,571 | 1/1961 | Lantz | 106—14 |
| 3,073,719 | 1/1963 | Albright et al. | 117—131 X |
| 3,085,900 | 8/1963 | Lopata et al. | 117—131 X |
| 3,110,691 | 11/1963 | Fisher | 260—37 X |

OTHER REFERENCES

Burns et al.: Protective Coatings for Metal, Reinhold Pub. Corp., 1955, p. 409.

JOSEPH B. SPENCER, *Primary Examiner.*

WILLIAM D. MARTIN, RICHARD D. NEVIUS,
*Examiners.*